United States Patent Office 3,444,875
Patented May 20, 1969

3,444,875
FLUID PRESSURE RATIO CONTROL DEVICES
Owen D. Furlong, Alan C. Rowe and Eric F. Wright, Yeovil, Somerset, England, assignors to Westland Aircraft Limited, Yeovil, England
Filed Mar. 25, 1966, Ser. No. 537,446
Claims priority, application Great Britain, Apr. 2, 1965, 14,077/65
Int. Cl. F15b 3/00; G05b 16/18
U.S. Cl. 137—37  16 Claims

ABSTRACT OF THE DISCLOSURE

In a system for fluid pressure ratio control, first and second pressures are sampled, and each is used to create a vortex flow of fluid in independent vortex chambers. Sensing flows, taken from a position disposed within the vortex flow in each of the vortex chambers, are compared in a pure fluid system such as a deflection type fluid amplifier, and an output signal, indicating for example the degree of a pressure increase across a turbine, is transmitted to an actuator which changes the pressure ratio to a predetermined level, such as by reducing the flow to the turbine.

---

This invention relates to systems which maintain a fluid pressure ratio across devices or units in ducts or compartments.

In comparing pressure conditions, it is useful to obtain a logarithmic function of the pressures so that these functions may be added or subtracted in order to obtain a ratio which is the product or dividend of the original pressures.

In order to obtain a logarithmic function, a sample of a flow or pressure is applied to create a vortex flow in a vortex chamber. Then, if an output flow or pressure is sampled from a part of the vortex nearer to the centre of the vortex that the power input, this output bears a logarithmic relationship to the pressure or flow applied to create the vortex.

In one aspect of the invention we provide a system for fluid pressure ratio control, wherein first and second pressures are sampled each to create a vortex flow of fluid in indepedent vortex chambers, a sensing flow, taken from a position disposed within the vortex flow in each of said vortex chambers, being utilised to actuate a mechanism which adjusts the first and second pressures to a predetermined ratio.

In another aspect, the invention consists in a system for fluid pressure ratio control, wherein a first fluid pressure is sampled to create or control a vortex flow of fluid in a vortex chamber and a sensing pressure, or a sensing sample flow of the vortex flow is taken from a position nearer to the centre of rotation of the vortex flow than the inlet of the flow creating the vortex flow, and the sensing pressure or sample flow is applied to a comparator in which the sensing pressure or sample flow is compared to a sample pressure or flow derived from a second fluid pressure and an output derived from the comparison; the output, amplified if required, being applied to means which control the ratio between the first and second pressures.

The second pressure or flow is frequently obtained as the sensing pressure or flow from a second vortex chamber.

Three embodiments of the invention will be described by way of example only, as applied to the control of the pressure ratio of fluids in a turbine during testing or operation, for surge control of a turbo-compressor, and for a change-over device for cabin pressurisation in high speed aircraft.

The embodiments will be described in relation to the accompanying drawings in which.

Figure 1:
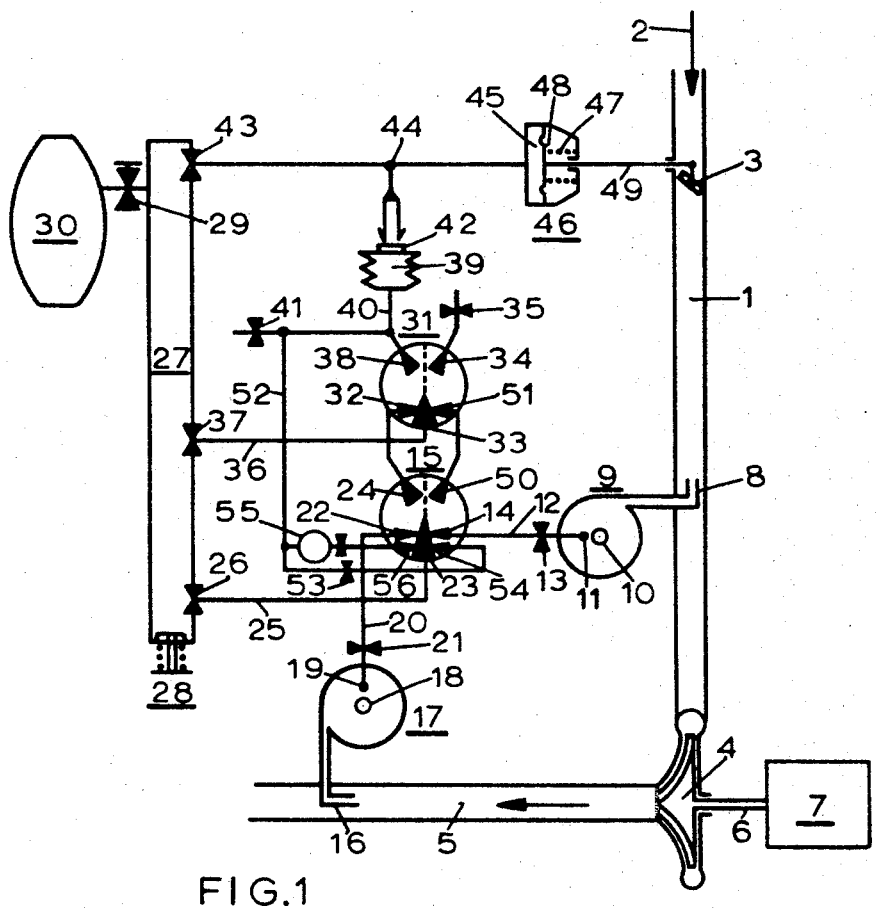
FIGURES 1, 2 and 3 show diagrammatically three variations of a system for a pressure ratio control for a turbine in an aircraft.

In FIGURE 1 air under pressure, supplied for example, from a compressor, by ram effect, or from the discharge of air from a pressurised aircraft cabin, enters a supply duct 1 in the direction of arrow 2 under the control of a butterfly valve 3.

The air-flow drives a radial flow turbine which constitutes an impedance to the flow of fluid and is discharged, for example, to ambient or into a low pressure sink through a discharge duct 5. The turbine 4 is coupled by a shaft 6 to drive a load 7.

The air in the supply duct 1 is sampled by a pitot tube 8 and the sample flow is applied to create a vortex flow in a vortex chamber 9. The flow through the vortex chamber 9 discharges to ambient or any other suitable sink through a central vortex outlet 10. A logarithmic function of the flow or pressure in the duct 1 is obtained by sampling the vortex flow from an orifice 11 nearer to the centre of the vortex 9 than the inlet creating the vortex. The output of the chamber 9 from orifice 11 is applied through a duct 12 via a restrictive orifice 13, to regulate the flow, to the control nozzle 14 of a deflection type of fluid amplifier device 15. In this specification a restrictive orifice or regulating orifice is to be understood to include any form of fixed or variable orifice as required.

Similarly, the air-flow in the discharge duct 5 of the turbine 4 is sampled by a pitot tube 16, and applied to produce a vortex flow in a vortex chamber 17. The flow in the chamber 17 discharges to sink through an outlet 18. The vortex flow is sampled through an orifice 19 to provide a logarithmic function of the discharge flow from the turbine 4 and the output applied to the amplifier 15 through a duct 20, a restrictive orifice 21 and a control nozzle 22 which opposes the output from the chamber 9 obtained from the turbine supply duct 1.

The logarithmic functions from the sensors 9 and 17 are compared by summation of the effects of the control nozzles 14 and 22 in the amplifier 15 acting as a comparator. The output of the comparison is in the form of a ratio of the pressures or flow in the inlet and discharge ducts 1 and 5. The restrictive orifices 13 and 21 are adjusted so that the output from the chambers 9 and 17 to the control nozzles 14 and 22 balance at a required ratio of pressure or flow between the inlet and discharge ducts 1 and 5.

If, for example, the ratio of pressure across the turbine 4 increases, due to an increase in the inlet duct pressure and a consequent increase in the turbine speed and pressure gradient, the output from the sensor 9, applied through control nozzle 14 to amplifier 15, overcomes the output from sensor 17, applied through control nozzle 22. The differential between the two control nozzles 14 and 22 directs the power jet issuing from nozzle 23 towards an outlet port 24. The power jet is supplied through duct 25 from a restrictive orifice 26 in a manifold 27. The manifold 27, which includes a pressure relief valve 28 is supplied through pressure reducing valve 29 from a pressure source, for example, a tapping from an aircraft engine 30.

The output from the outlet orifice 24 is applied to a second stage amplifier 31 and issues from a control nozzle 32 to direct the flow from a power nozzle 33 into an outlet 34. The outlet nozzle vents to ambient through a restrictive orifice 35. The power nozzle 33 is supplied by way of a duct 36 from a restrictive orifice 37 in the supply manifold 27.

Due to the flow of the power nozzle 33 being directed into outlet orifice 34, the pressure in the other outlet orifice 38 and in a capsule 39, connected by a duct 40 to the outlet orifice 38, will reduce and the capsule 39 will contract. In order to avoid the amplifier 31 from operating through the outlet orifice 38 into a closed circuit, the outlet is vented to ambient through a restriction 41. Contraction of the capsule 39 opens a pad valve 42 which allows air, supplied from the manifold 27 through restriction 43, to escape from a supply duct 44. The air escape reduces the pressure in a chamber 45 of a valve actuator 46 and allows a spring 47 to move a diaphragm 48 against the pressure in the chamber 45. The diaphragm 48 is connected by a linkage 49 to the butterfly valve 3, and when actuated by extension of the spring 47, the valve 3 closes to reduce the flow to the turbine 4. Accordingly, the pressure ratio across the turbine tends to be reduced to the state where the output from the vortex chambers 9 and 17, applied into the comparator amplifier 15, balances.

In the case of a reduction of the pressure in the duct 1, the speed of the turbine 4 reduces and the pressure ratio across the turbine decreases. The effect of the output from the vortex chamber 17 in the discharge duct 5 acting through control nozzle 22 in the comparator amplifier 15 exceeds the effect of nozzle 12 from chamber 9 and the control jet from nozzle 23 is directed into outlet 50. The output from orifice 50 is ducted to discharge from a control nozzle 51 in amplifier 31, and directs the control jet from nozzle 33 into outlet orifice 38. The outlet from amplifier 31 flows through duct 40, and expands the capsule 39 to close the pad valve 42. Pressure builds up in duct 44 and chamber 45 and causes the diaphragm 48 to move linkage 49, open the butterfly valve 3 and increase the flow and pressure in the supply duct 1.

In order to avoid surging and hunting of the butterfly valve 3, a feedback, taken from the output to the capsule 39, passes any surge through a feedback duct 52 by a direct route, including a restricted orifice 53, to affect a control nozzle 54 in the amplifier 15. In addition, the surge is also passed through a capacitance 55 before affecting an opposed control nozzle 56 in amplifier 15. In the case of a surge increase in the feedback duct 52, the rapid increase of pressure from jet 54 will tend to direct the power jet issuing from nozzle 23 towards outlet orifice 24. This issues from control nozzle 32 and tends to divert control jet 33 into outlet orifice 34, which reduces the surge increase at outlet 38.

In the case of a pressure reduction at output 38, the effect of the feedback will be to reduce the pressure rapidly from control nozzle 54 and the power jet from nozzle 23 will be directed into outlet orifice 50. This flow issuing from control jet 51 will tend to divert the power jet from nozzle 33 into orifice 38 to maintain the pressure. In either case, the effect of the feedback is to act in opposition to the original control which is producing the change. In the case of steady conditions, the direct feedback issuing from control nozzle 54 and the delayed feedback through the capacitance 55 issuing from control nozzle 56 will balance, and the control system will be unaffected.

Figure 2:
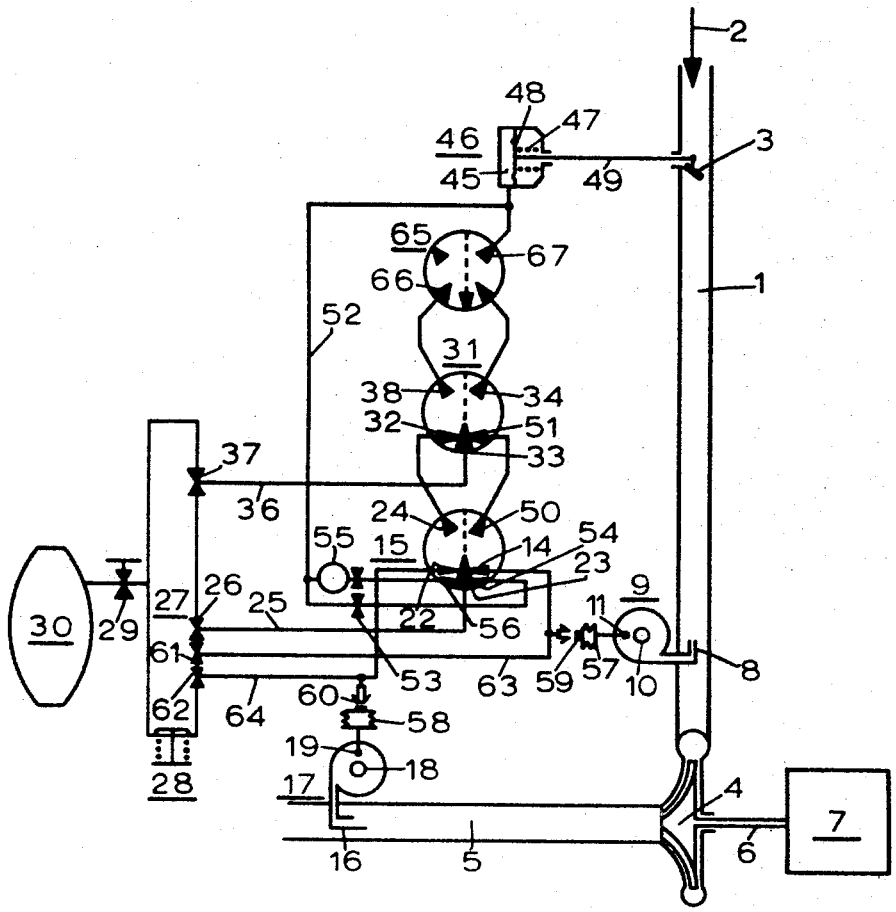

In FIGURE 2, the pressure in the vortex chambers 9 and 17 is sensed by two capsules 57 and 58 instead of sampling the flow as in the previous variant. The capsules operate pad valves 59 and 60 which bleed a flow from the manifold 27 through orifices 61 and 62 and ducts 63 and 64 to vary the pressures on the control jets 14 and 22 in the comparator amplifier 15 which operates to produce a ratio output as in the previous description.

The output from the final amplifier 31 is applied to a passive difference junction 65 instead of to the pad valve system. The passive difference junction has no power jet, one control jet 66 is directed towards an outlet orifice 67 which is connected to pressurise the chamber 45 in the valve actuator 46 and operate butterfly valve 3, and the other control jet is vented. The passive difference junction has the object of avoiding the application of the output of the final amplifier 31 into a closed circuit.

Figure 3:
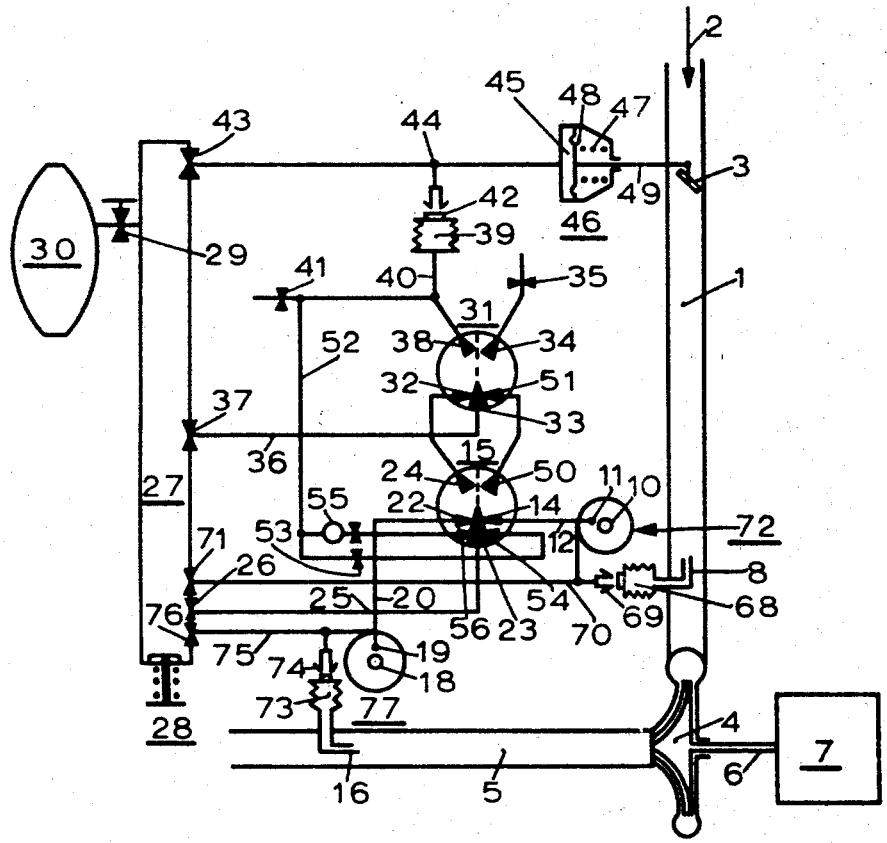

In FIGURE 3, pitot tubes 8 and 16 sample the pressure in the supply and discharge ducts 1 and 5 and apply this pressure to capsules 68 and 73. The capsules 68 and 73 operate pad valves 69 and 74 and vary the bleed in ducts 70 and 75 which connect restrictive orifices 71 and 76 in the manifold 27 to the vortex chambers 72 and 77. Thus, the flow creating the vortices is varied according to the pressure in the supply and discharge ducts 1 and 5. The logarithmic output from the vortex chambers 72 and 77 is taken, as before, through orifices 11 and 19 and applied to the control nozzles 14 and 22 in the comparator amplifier 15. The remainder of the circuit is similar to that shown in FIGURE 1 and operates in a similar way.

Figure 4:
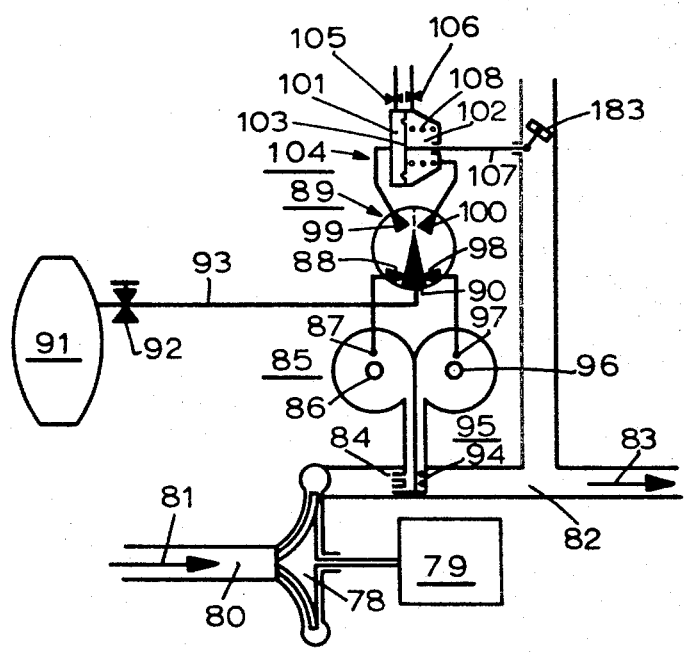
FIGURES 4 and 5 show diagrammatically two variations of a system for the surge control of a compressor.

FIGURE 4 shows a system according to the invention for surge control on a radial flow turbo compressor 78. The compressor 78, driven by a motor 79, receives air through a duct 80 in the direction of arrow 81, and discharges the air through duct 82 in the direction of arrow 83.

Under conditions of violent fluctuations of inlet flow through duct 80 the compressor 78 can break up. For example, if the compressor 78 is suddenly starved of air, the flow through the compressor 78 can reverse, and the compressor will stall and fracture.

Adverse conditions arise when the ratio of total to static pressure in the discharge pipe 82 falls below a minimum value. Accordingly, in the system, the total pressure in the discharge pipe 82 is sampled by the flow through a pitot scanning tube 84 which has orifices facing against the direction of flow from the compressor shown by arrow 83. The flow from the pitot tube 84 is applied to create a vortex flow in a vortex chamber 85 which vents to sink through orifice 86. A logarithmic output is obtained from the vortex chamber 85 through orifice 87 and applied to the control nozzle 88 of a comparator amplifier 89. The power nozzle 90 of the amplifier 89 is supplied from a tapping from an aircraft engine 91, via a reducing valve 92 and a duct 93.

Besides sampling the total pressure in the discharge duct 82, the static pressure is sampled by a flow through a static tube 94 which has orifices at right angles to the direction of flow in the duct 82. The flow from the static tube 94 is used to create a vortex flow in a vortex chamber 95 which vents to a sink 96, and the output from the vortex chamber is taken via orifice 97 and applied in opposition to the output from the total pressure sensor, through a control nozzle 98. The logarithmic functions of the total and static pressures issuing from the control nozzles 88 and 98 are summated in their effect on the jet issuing from the power nozzle 90, to provide a ratio of the total to static pressure at the outlet orifices 99 and 100 of the comparator amplifier 89. The output from the amplifier 89 is applied to a pneumatic valve actuator 104 into opposed chambers 101 and 102, separated by a diaphragm 103 and vented to ambient through restrictive orifices 105 and 106. Attached to the diaphragm 103 is a linkage 107 which operates a butterfly valve 183 to spill air from the discharge duct 82 in the event of conditions liable to damage the compressor.

In operation, if the ratio of total pressure to static reduces to a minimum, for example in the case of a reduction of flow through the discharge duct 82 combined with a high discharge pressure, the output from vortex chamber 95 exceeds that from vortex chamber 85, and the power jet from nozzle 90 in amplifier 89 is directed towards outlet orifice 99 by the higher power from control jet 98. Thus, the pressure in chamber 101 exceeds that in chamber 102 of the valve actuator and the diaphragm 103 is depressed against spring 108, and moves linkage 107 to open spill valve 183. The pressurised air in the duct 82 discharges rapidly to ambient, and the ratio of total to static pressure will increase. When the ratio has built up to a satisfactory value, the output from vortex chamber 85 will exceed that from vortex chamber 95 and the power jet from nozzle 90 will be deflected towards collecting orifice 100. The pressure in chamber 102 will exceed that in chamber 101, so, assisted by the spring 108, the diaphragm 103 will move the linkage 107 to close the butterfly valve 183, and the compressor 78 will resume its normal function.

Figure 5:
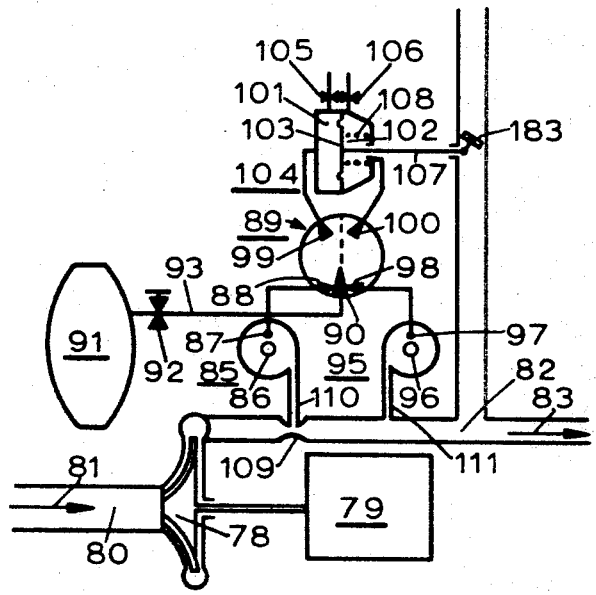

As shown in FIGURE 5, a variant of the system described above provides a small diameter venturi throat 109 in the discharge duct 89. The pressure at the throat 109 is sampled through a duct 110 and creates the flow in one of the vortex chambers 85. The pressure and flow in the discharge duct 82 downstream of the venturi throat 109 is sampled by a duct 111 and applied to create the flow in the other vortex chamber 95. The output from the vortex chambers 85 and 95 is taken as before, and applied to the comparator amplifier 89 to obtain a ratio between the venturi throat pressure and the discharge duct pressure downstream of the venturi 109. The ratio is not a ratio of total to static pressures, such as that obtained in the previous embodiment, but provides means which, in operation, avoid damage to the compressor 78.

Figure 6:
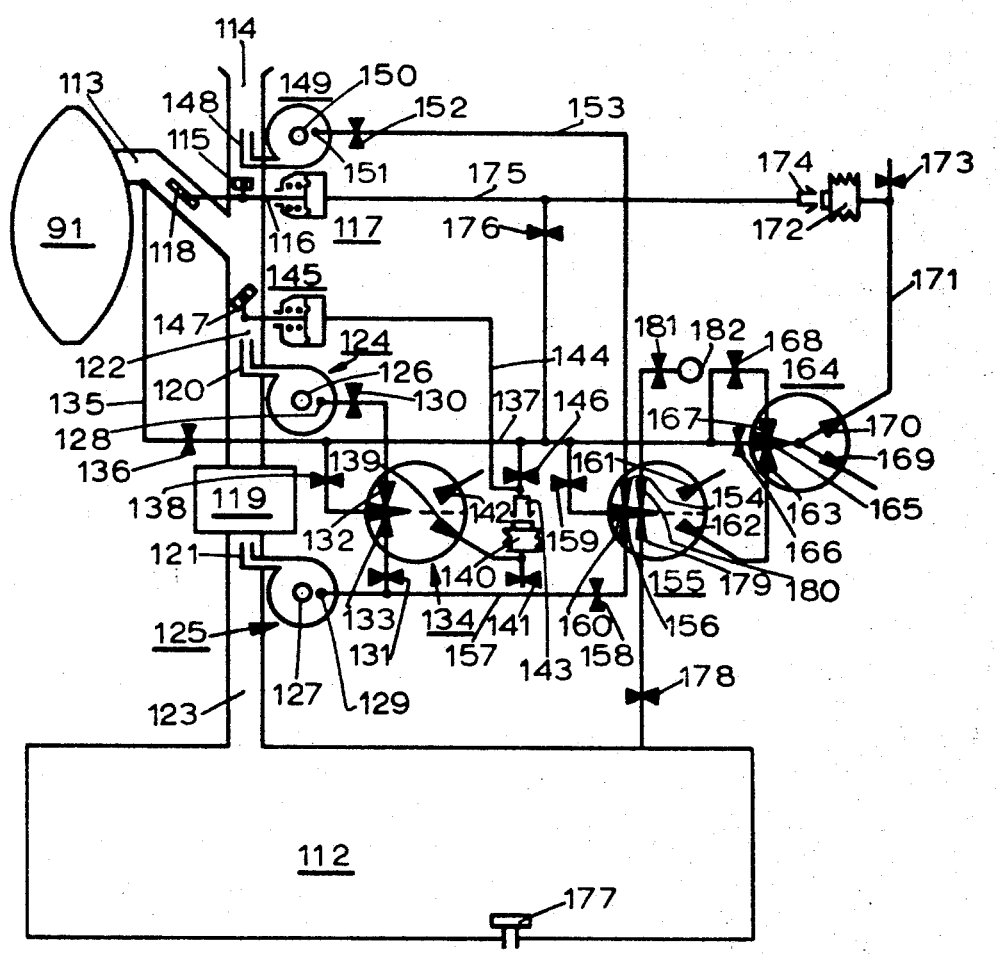
FIGURE 6 shows diagrammatically a system of pressure ratio control for the cabin or compartments of a high speed aircraft.

In FIGURE 6, the invention is employed in the control of conditioning and pressurisation of a compartment 112 in a high speed aircraft. In order to supply pressure and conditioned air to the compartment, air is either tapped from the aircraft engine 91 through a duct 113, or under high speed conditions, when the pressure is sufficient, air is inducted through a ram air intake 114, which can, if required, form a part of the intake duct to the engine. During flight at speeds insufficient to provide adequate air supplies, the ram air intake is closed by a butterfly valve 115 which is operated by a linkage 116 from an actuator 117. Also coupled to the linkage 116 and actuator 117 is a butterfly valve 118 in the air duct 113 from the engine 91. The valve 118 in the engine tapping 113 close during high speed flight when the valve 115 in the ram air duct 114 opens for saving the drain on engine power. Air, passing from the engine 91 or the ram air induction 114 to the compartment 112, is conditioned by heat exchangers, water extractors, compressors or expansion units, which constitute an impedance to the flow of fluid. These units are generally indciated at 119. In order to obtain a satisfactory efficiency, an optimum pressure ratio should be maintained across the conditioning units 119. This object is achieved by a simplified circuit similar to that shown in FIGURE 1. The circuit includes pitot tubes 120 and 121 which sample the flow in the air supply ducts 122 and 123 on either side of the conditioning units 119, and supply power to two vortex chambers 124 and 125, venting to ambient through orifices 126 and 127. The output from the chambers 124 and 125 is taken from orifices 128 and 129 and fed via restricting orifices 130 and 131 to control nozzles 132 and 133 in a fluid amplifier 134. Power for the amplifier 134 is supplied from the engine 91 by a duct 135, a reducing valve 136, a manifold line 137 and a restricting orifice 138. In the same way as described previously, the ratio output from the amplifier 134 is taken from an outlet orifice 139 to feed a capsule 140. The other outlet orifice 142 is vented to ambient and the capsule is vented by a restricting orifice 141 to avoid a closed circuit. The capsule 140 operates a pad valve 143 which controls a bleed on the supply line 144 to a valve actuator 145. The line 144 is supplied from the manifold 137 via a restrictor 146. The valve actuator 145 operates a valve 147 which controls the ratio of pressures across the units 119 in a manner similar to that described for the turbine unit with reference to FIGURES 1, 2 and 3.

In order to bring into operation ram air for pressurisation and conditioning, additional controls are provided which sense the ratio of the pressure between the ram air intake 114 and the air in the supply duct 123, downstream of the conditioning unit, so that when the ratio is sufficient the valve 115 opens, and valve 118 closes.

This is achieved by providing a pitot tube 148 which samples the ram air intake 114 to create a vortex flow in a vortex chamber 149 and vents to sink through orifice 150. The output from the vortex chamber is taken from an orifice 151 and applied through a restrictor 152 and a duct 153 to a control nozzle 154 of a comparator amplifier 155. The opposed control nozzle 156 of the amplifier 155 is supplied through a duct 157 and restrictor 158 from the output orifice 129 of the vortex chamber 125 which sensed the pressure in the duct 123 downstream of the conditioning units 119. The amplifier 155 is powered from the manifold 137 through a restrictor 159 and power nozzle 160. One side of the amplifier output from orifice 161 is vented, and the other output from orifice 162 is taken to one of the control nozzles 163 of a biased output amplifier 164. This is preferably a wall attachment digital amplifier which provides an "on-off" switching action. The power for the output amplifier 164 is supplied via restriction 166 from the manifold 137 to the power nozzle 165. The other control nozzle 163 of the output amplifier 164, which opposes the output from the comparator amplifier 155, provides a fixed bias being supplied via a restrictive orifice 168 from the manifold 137. Unless the control output from nozzle 163 exceeds the bias output from nozzle 167, the power jet from nozzle 165 is directed to vent through outlet orifice 169. When the control jet from nozzle 163 overcomes the biasing jet from nozzle 167, the power jet from nozzle 165 is directed through outlet orifice 170 and duct 171 to a capsule 172, vented by a restricting orifice 173. Under pressure, the capsule 172 closes a pad valve 174 to stop the bleed from a duct 175 supplied through a restrictor 176 from the manifold and connected to the valve actuator 117. An increase of pressure in the valve actuator 117 changes over the butterfly valves 115 and 118 in the ram air and engine tapping ducts 114 and 113 for operation on ram air.

In addition to the ratio control on the valves 115 and 118 which originates from the pitot tubes 121 and 148, a second control is necessary to override the ratio control in the event that although the ratio is suitable for optimum operation of the pressurisation and conditioning units 119, there is insufficient ram air flow to maintain the compartment pressure against leakage and discharge flow through a discharge valve 177. This control is effected by tapping the compartment air through a restrictive orifice 178 to supply a control nozzle 179 in the comparator amplifier 155. Opposed to this supply is a control nozzle 180, which, via a restrictor 181, is vented to ambient through orifice 182. In operation these control nozzles 179 and 180 balance at ground level, and remain balanced whilst the aircraft climbs, until the cabin pressurisation control operates upon the discharge valve 177 to cause a differential pressure between cabin and ambient. The pressure from nozzle 179 then tends to overcome that from nozzle 180 and direct the power jet from nozzle 160 to vent through orifice 161. However, if the effect of the output from the vortex chamber 149, sensing the pressure in the ram intake and operating through nozzle 154, is sufficiently in excess of the output from the vortex chamber 125, operating through nozzle 156, to overcome the differential between the compartment pressure issuing from nozzle 179 and ambient sensed at nozzle 180, the power jet will continue to issue through outlet orifice 162 and the aircraft pressurisation and conditioning will continue to operate on ram air. When the ram air is insufficient to cope with the ratio across the control unit 119 and supply sufficient air to maintain the cabin differential, the jet from control nozzle 156 and 179 will overcome the effect of nozzles 154 and 180 and the power jet will be directed to vent through orifice 161. Accordingly, the actuator 117 will change over the valves 115 and 118 to operate the conditioning and pressurisation from the engine tapping 113.

It will be obvious that numerous modifications and variations can be made in any of the circuits described, such as by employing different types of fluid amplifiers, capsules, restricting or regulating orifices and feedback, and in the methods of sensing pressures in ducts without departing from the scope of the invention; and although the embodiments described are with reference to aircraft, these circuits are equally suitable for other applications where ratio control is required, although in this case it may be necessary to use other sources of power supply, for example, compressors, reservoirs, or compressed fluid tanks. In addition, although air has been used in the applications described, other fluids, including liquids, can operate similar systems. The systems can incorporate electrical switches, linkages, comparators, amplifiers, or actuators if desired, for example, to provide remote control linkages or conserve pneumatic power.

Besides operational use, these ratio devices are particularly suitable for testing apparatus. They can be used to hold a ratio across a unit whilst varying other conditions of operation, such as pressure or temperature driving tests to obtain the power output or input requirements of the unit. In addition, operational testing of units can be performed by relatively unskilled operatives without fear of overspeeding or damage, as the pressure ratios will be held within acceptable limits.

We claim as our invention:

1. A system for fluid pressure ratio control comprising two independent vortex chambers, means for sampling first and second fluid pressures and establishing respective vortex flows of fluid in said independent vortex chambers in accordance with said first and second pressures, actuatable means for adjusting the ratio between said first and second fluid pressures, and means for sensing the respective conditions within the vortex flows of said independent vortex chambers and actuating said actuatable means to maintain a predetermined ratio between the first and second pressures.

2. A system as claimed in claim 1 wherein said first mentioned means conducts sampled fluids from said first and second fluid pressures and injects the sampled fluids into said vortex chambers to create the vortex flows therein.

3. A system as claimed in claim 1 wherein vortex drive fluids are conducted to said vortex chambers to create the vortex flows therein, and wherein said first mentioned means includes means for controlling said vortex drive fluids in accordance with said first and second pressures so as to establish vortex flows in accordance with said first and second pressures.

4. A system as claimed in claim 1 wherein said last mentioned means includes a comparator for comparing the pressures within said vortex chambers.

5. A system as claimed in claim 1 wherein said last mentioned means comprises a comparator for comparing fluid flows tapped from said vortex chambers at points disposed within the vortex flow in each chamber.

6. A system as claimed in claim 1 wherein said last mentioned means senses the conditions within the respective vortex flows at positions nearer to the centers of rotation of the vortex flows than the inlets of the flows creating the vortex flows.

7. A system as claimed in claim 6 wherein said last mentioned means includes a deflection type fluid amplifier having control nozzles controlled in accordance with the conditions sensed in said vortex chambers.

8. A system as claimed in claim 1 wherein the first pressure is the pressure in a duct delivering fluid to a device constituting an impedance to flow of fluid.

9. A system as claimed in claim 1 wherein the second pressure is the pressure in a duct conducting fluid from a device constituting an impedance to flow of fluid.

10. A system as claimed in claim 8 wherein the device constituting an impedance is a turbine.

11. A system as claimed in claim 8 wherein the device constituting an impedance includes heat exchange means.

12. A system as claimed in claim 1 wherein the first pressure is a total pressure in a duct and the second pressure is a static pressure in a duct.

13. A system as claimed in claim 1 wherein the first pressure is the pressure at the throat of a venturi in a duct and the second pressure is the pressure in the duct downstream of the venturi.

14. A system for fluid pressure ratio control, comprising a vortex chamber, means for sampling a first fluid pressure and establishing a vortex flow of fluid in said vortex chamber in accordance with the first fluid pressure, a comparator for comparing corresponding characteristics of two applied fluids and producing an output in accordance with the comparison, means for sensing the conditions in said vortex chamber at a position nearer to the center of rotation of the vortex flow than the inlet of the flow creating the vortex flow and applying to said comparator a fluid in accordance with the sensed conditions, means for applying to said comparator a fluid in accordance with the conditions of a second fluid pressure, and means responsive to the output of said comparator for controlling the ratio between the first and second fluid pressures.

15. A system as claimed in claim 14 wherein said means for applying to said comparator a fluid in accordance with the conditions of a second fluid pressure comprises a second vortex chamber, means for sampling a second fluid pressure and establishing a vortex flow of fluid in said second vortex chamber in accordance with the second fluid pressure, and means for sensing the conditions in said second vortex chamber at a position nearer to the center of rotation of the vortex flow than the inlet of the flow creating the vortex flow and applying to said comparator a fluid in accordance with the sensed conditions in said second vortex chamber.

16. A system as claimed in claim 15 wherein said comparator comprises a deflection type fluid amplifier having respective control nozzles supplied with deflecting fluid in accordance with the pressures sensed in said respective vortex chambers.

References Cited

UNITED STATES PATENTS

| | | | |
|---|---|---|---|
| 2,918,929 | 12/1959 | Ferguson | 137—37 |
| 3,248,043 | 4/1966 | Taplin. | |
| 3,260,271 | 7/1966 | Katz | 137—36 |
| 3,276,259 | 10/1966 | Bowles | 137—81.5 X |
| 3,285,262 | 11/1966 | Ernst | 137—81.5 |
| 3,336,931 | 8/1967 | Fox | 137—81.5 |
| 3,339,571 | 9/1967 | Hatch | 137—81.5 |
| 3,342,196 | 9/1967 | Przybylko | 137—36 |

CLARENCE R. GORDON, *Primary Examiner.*